United States Patent Office 3,424,725
Patented Jan. 28, 1969

3,424,725
COPOLYMERS OF TRIOXANE, CYCLIC ETHERS, AND BIFUNCTIONAL EPOXIDES AND A PROCESS FOR THEIR MANUFACTURE
Edgar Fischer, Frankfurt am Main, and Claus Schott, Hofheim, Taunus, Germany, assignors to Farbwerke Hoechst Aktiengesellschaft vormals Meister Lucius & Bruning, Frankfurt am Main, Germany, a corporation of Germany
No Drawing. Filed Oct. 1, 1965, Ser. No. 492,326
Claims priority, application Germany, Oct. 1, 1964,
F 44,106
U.S. Cl. 260—73               4 Claims
Int. Cl. C08g 1/14, 1/12, 30/10

ABSTRACT OF THE DISCLOSURE

A process has been provided for the manufacture of copolymers of trioxane, cyclic ethers and/or cyclic formals and glycidyl ethers in the presence of a cationic, polymerization catalyst at temperatures in the range of from −50 to +100° C., which comprises polymerizing 98.89 to 89% by weight of trioxane, 1 to 10% by weight of a cyclic ether and 0.01 to 1% by weight of a diglycidyl ether of an unsaturated aliphatic diol of 4 to 8 carbon atoms, the percentages being calculated on the weight of the total monomer mixture. Copolymers of 98.89 to 89.0% by weight of trioxane, 1 to 10% by weight of a cyclic ether and 0.01 to 1% by weight of a diglycidyl ether of an unsaturated aliphatic diol of 4 to 8 carbon atoms, the percentages being calculated on the weight of the total monomer mixture are also within the scope of the invention. These copolymers are suitable for manufacturing articles by an extrusion molding process or an ejection molding process.

The present invention relates to new copolymers of trioxane, cyclic ethers and bifunctional epoxides and a process for their manufacture. It is known that high-molecular polymers with recurring oxymethylene units can be obtained by polymerizing formaldehyde or trioxane. The polymers thus obtained contain unstable semi-formal terminal groups by which fact these polymers are degraded and thereby re-formed to a large extent into formaldehyde when being subjected to thermal stress. It is also known to obtain copolymers by copolymerizing trioxane with saturated cyclic acetals or ethers. By the incorporation in the polymer of a cyclic acetal, for example, glycol-formal, and when subjecting the resulting polymers to thermal stress, the degradation that begins at the end of a chain stops after reaching the first comonomer unit. Thus it is possible to manufacture copolymers, for example, on the basis of trioxane-glycolformal, which after degradation of their unstable constituents are particularly suitable for injection-moulding.

Moreover, it has been proposed to manufacture copolymers on the basis of trioxane, cyclic acetals such as glycolformal, or cyclic ethers such as ethylene oxide, and bifunctional cyclic ethers such as diglycidyl ethers of aliphatic diols, which copolymers—after degradation of their unstable constituents—yield novel products due to the branching and cross-linking effect of the bifunctional comonomer, products that are particularly suitable for extrusion blowing.

Now we have found that copolymers of trioxane, cyclic ethers and diglycidyl ethers can be manufactured advantageously by polymerizing mixtures of from 98.89 to 89.0% by weight of trioxane, 1 to 10% by weight of a cyclic ether and 0.01 to 1% by weight of diglycidyl ether of an unsaturated aliphatic diol.

As cyclic ethers there are used compounds of the general formula

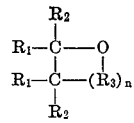

in which $R_1$ and $R_2$ represent H or low molecular weight alkyl radicals or low molecular weight halogen-substituted alkyl radicals and $R_3$ represents a methylene or oxymethylene radical, a low alkyl- or halogen-alkyl-substituted methylene radical, or a low alkyl- or halogen-alkyl-substituted oxymethylene radical, and $n$ stands for a number from 0 to 3. Suitable cyclic ethers are, for example, ethylene oxide, propylene oxide, epichlorohydrin, glycolformal, diglycolformal and 4-chloromethyl dioxolane.

As diglycidyl ethers of unsaturated aliphatic diols, which diols may be linear or branched and may contain 4 to 8 carbon atoms, there are preferably used butene-2-diol-1,4-diglycidyl ether or hexene-3-diol-2,5-diglycidyl ether. It is of particular advantage to use butine-2-diol-1,4-diglycidyl ether.

When using copolymers of this type it is possible to obtain the viscous elasticity which is of importance for the working up, with the application of considerably lower amounts of the termonomer, because the unsaturated groups take part in the polymerization reaction, thus influencing the properties of the product. The viscous elasticity is expressed as a ratio of the melt indices $i_{20}/i_2$ (according to ASTM–D 1238–52 T).

When using the monomers in the proportions given above, polymerization may be carried out according to the methods hitherto applied, i.e., in substance, in solution or in suspension. As solvents may be preferably used inert aliphatic and aromatic hydrocarbons, halogenated hydrocarbons or ethers. Polymerization in substance proceeds particularly well. According to the solvent used polymerization is carried out at a temperature in the range of from −50 to +100° C.

As catalysts may be used substances capable of starting a cationic polymerization, for example, inorganic and organic acids, acid halides and especially Lewis acids (definition for the Lewis acids see Kortüm: "Lehrbuch der Elektrochemie," Wiesbaden 1948, pages 300 to 301). Among these latter, boron fluoride and its complex compounds, for example, boron fluoride etherates, are very well suitable. Diazonium fluoro borates are particularly useful. On principle there may also be used any of the known cationic catalysts, for example, the compounds known from British Patent 943,684.

The catalyst concentration may vary within wide limits. It is determined by the type of the catalyst and by the molecular weight which the polymer is intended to have and may range between 0.0001 and 1% by weight, calculated on the monomer mixture. 0.001 to 0.1% by weight of catalyst is preferably used.

As the catalysts tend to degrade the polymer it is advisable to make then ineffective immediately after termination of the polymerization, with the aid of, for example, ammonia or amine solutions in methanol or in acetone.

The elimination of the unstable semi-acetal terminal groups may be carried out as in the case of other copolymers. It is advisable to suspend the polymer in aqueous ammonia at a temperature in the range of from 100 to 200° C.—if desired in the presence of swelling agents such as methanol or n-propanol—or to dissolve the polymer at a temperature above 100° C. in a medium having an alkaline reaction, with subsequent reprecipitation. Appropriate solvents are, for exmaple, benzyl alcohol, ethylene-glycol monoethyl ether or a mixture consisting of 60% methanol and 40% water, suitable compounds with an alkaline reaction being ammonia and aliphatic amines.

The polymer can be stabilized against the action of heat, light and oxygen in the same manner as the other co- or terpolymers of trioxane. As heat stabilizers, for example, polyamides, amides of polybasic carboxylic acids, amidines and urea compounds are suitable. Phenols, particularly bisphenols and aromatic amines, are suitable oxidation stabilizers. Derivatives of α-oxybenzophenone are appropriate for light-stabilizing.

The stabilized products thus obtained are especially suitable for being extruded or worked up according to the extrusion blowing process, but they may also be used for the manufacture of injection moulded articles, sheets, films and fibres.

The following examples serve to illustrate the invention, but they are not intended to limit it thereto.

Example 1

Freshly distilled trioxane containing 2% by weight of of ethylene oxide, 0.1% by weight of butene-2-diol-1,4-diglycidyl ether and 100 p.p.m. of methylol as regulator, was pumped from a heated storage vessel which was under an atmosphere of nitrogen, into a Ko-kneader into which a solution of boron trifluoride dibutyl etherate in cyclohexane 1:80 was injected at such a speed that the concentration of $BF_3$ contained in the monomer mixture was 85 p.p.m.

From the Ko-kneader the polymer fell into a 1% aqueous solution of ammonia, in which it was accumulated until hydrolyzation. The polymer was ground into grains having the desired dimensions and then hydrolyzed heterogeneously with a solid content of 20%, at 141° C. under a pressure of 3.4 atmospheres gage, for 45 minutes. The resulting product was washed and dried.

The melt index according to ASTM–D 1238–52 T was $i_2=1.0$. Upon being treated for 45 minutes under an atmosphere of air at 230° C. the stabilized product (10 mg. of dicyanodiamide and 35 mg. of 2,2-methylene-bis-methyl-6-tert.butylphenol per 5 g. of polymer) lost 0.017% per minute of its weight.

Example 2

100 g. of liquid trioxane, 6 g. of diglycolformal and 0.05 cm.³ of hexene-3-diol-2,5-diglycidyl ether were introduced into a pre-heated screw-top glass bottle and mixed well. 10 mg. of p-nitrophenyldiazonium fluoroborate were then added. The screw-top glass bottle was closed and placed in a water bath having a temperature of 70° C. After about 5 minutes the beginning polymerization was indicated by turbidity. After about an hour polymerization was terminated. The glass bottle was then smashed and the product was disintegrated. Subsequently the product was extracted by boiling with methanol in the presence of 1% of triethanolamine. The extent of conversion was 79%, calculated on the monomer mixture.

The polymer was then subjected to homogeneous hydrolysis, for which purpose it was dissolved in 1 l. of benzyl alcohol containing 1% of triethanolamine, at 150° C. and stirred for half an hour at this same temperature. After cooling the product was precipitated with methanol, sucked off and again extracted by boiling with methanol during half an hour. Finally the polymer was sucked off, washed with methanol three times and dried.

The melt index was $i_2=0.4$.

Example 3

A mixture of 1,000 g. of freshly distilled trioxane, 20 g. of ethylene oxide and 0.1 g. of butine-2-diol-1,4-diglycidyl ether, to which 100 mg. of p-nitrophenyldiazonium fluoroborate had been added previously, was poured into a mould of refined steel, which was scavenged with nitrogen. The mould was placed in a water bath having a temperature of 70° C. The progress of the reaction was measured with a thermoelement. The temperature in the block rose up to 90° C. After one hour the mould was cooled and the polymer block was comminuted and ground. 50 g. of the polymer were hydrolyzed as described in Example 2. The melt index $i_2$ was 0.6, the ratio of the melt indices determined under a 21.6 kg. ($i_{20}$) and 2.16 kg. ($i_2$) charge, was 41.5.

Comparison example

In a process as described in Example 3, 1,000 g. of trioxane, 20 g. of ethylene oxide, 0.5 g. of butanediol diglycidyl ether and 100 mg. of p-nitrophenyldiazonium fluoroborate were placed in a mould of refined steel and then polymerized. 50 g. of the ground polymer were hydrolyzed as described in Example 2. The melt index was $i_2=0.5$ and the ratio of $i_{20}/i_2$ was 40.6.

We claim:

1. A process for the manufacture of copolymers of trioxane, cyclic ethers and/or cyclic formals and glycidyl ethers in the presence of cationic catalysts selected from the group consisting of boron fluoride, a boron fluoride complex, a boron fluoride, etherate, and a diazonium fluoro borate at temperatures in the range of from $-50°$ to $+100°$ C., which comprises polymerizing
    (a) 98.99 to 89.90% by weight of trioxane,
    (b) 1 to 10% by weight of a cyclic ether or a cyclic formal of the general formula

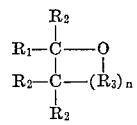

in which $R_1$ and $R_2$ each represent a member selected from the group consisting of hydrogen atoms, low molecular weight alkyl radicals and low molecular weight halogen-substituted alkyl radicals, $R_3$ is a member selected from the group consisting of a methylene radical, an oxymethylene radical, a low molecular weight alkyl-substituted methylene radical, a low molecular weight halogen-alkyl-substituted methylene radical, a low molecular weight alkyl-substituted oxymethylene radical and a low molecular weight halogen-alkyl-substituted oxymethylene radical and $n$ stands for a member selected from the group consisting of 0, 1, 2, and 3, and
    (c) 0.01 to 0.1% by weight of a diglycidyl ether of an unsaturated aliphatic diol having 4 to 8 carbon atoms, the percentages being calculated on the weight of the total monomer mixture.

2. A process as claimed in claim 1, wherein the cyclic ether is a member selected from the group consisting of ethylene oxide, propylene oxide, epichlorohydrin, glycolformal, diglycolformal and 4-chloromethyl dioxolane.

3. A process as claimed in claim 1, wherein the diglycidyl ether of an unsaturated aliphatic diol is a member selected from the group consisting of butene-2-diol-1,4-diglycidyl ether, hexene-3-diol-2,5-diglycidyl ether and butine-2-diol-1,4-diglycidyl ether.

4. Copolymers of 98.89 to 89.0% by weight of trioxane; 1 to 10% by weight of a cyclic ether or cyclic formal of the general formula

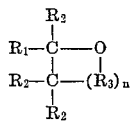

in which $R_1$ and $R_2$ each represents a member selected from the group consisting of hydrogen atoms, low molecular weight alkyl radicals and low molecular weight halogen-substituted alkyl radicals, $R_3$ is a member selected from the group consisting of a methylene radical, an oxymethylene radical, a low molecular weight alkyl-substituted methylene radical, a low molecular weight halogen-alkyl-substitdted methylene radical, a low molecular weight alkyl-substituted oxymethylene radical, and a low molecular weight halogen-alkyl-substituted oxymethylene radical and $n$ stands for a member selected from the group consisting of 0, 1, 2, and 3; and 0.01 to 1% by weight of a diglycidyl ether of an unsaturated aliphatic diol of 4 to 8 carbon atoms, the percentages being calculated on the weight of the total monomer mixture.

References Cited

UNITED STATES PATENTS

| | | | |
|---|---|---|---|
| 3,065,213 | 11/1962 | Vandenberg | 260—88.3 |
| 3,275,604 | 9/1966 | Kray et al. | 260—67 |
| 3,293,219 | 12/1966 | Gottesman et al. | 260—67 |
| 3,297,647 | 1/1967 | Schott et al. | 260—73 |
| 3,135,706 | 6/1964 | Vandenberg | 260—2 |
| 3,208,975 | 9/1965 | Vandenberg | 260—67 |

WILLIAM H. SHORT, *Primary Examiner.*

L. M. PHYNES, *Assistant Examiner.*

U.S. Cl. X.R.

260—45.8, 45.85, 45.9, 45.95